UNITED STATES PATENT OFFICE.

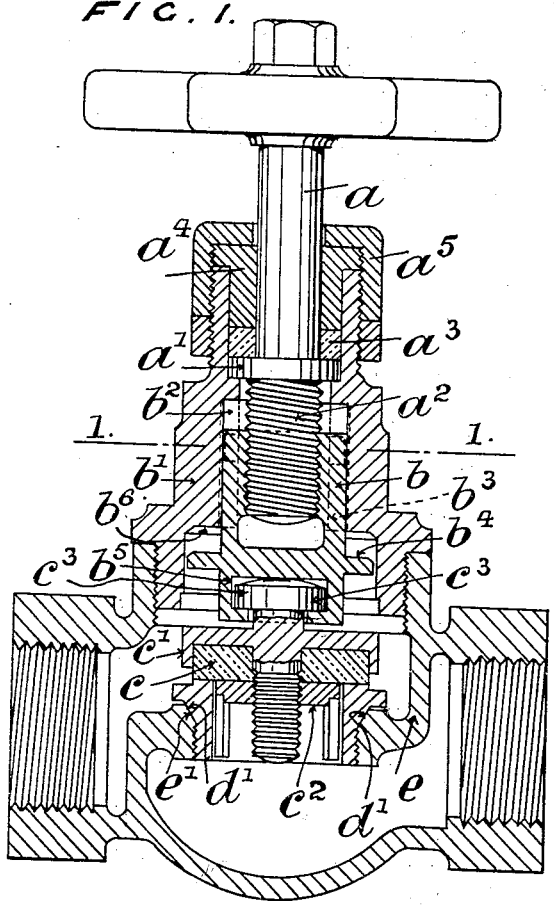
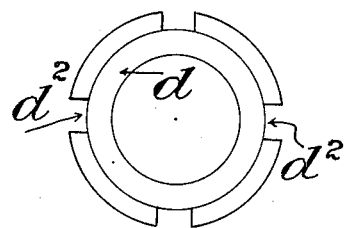
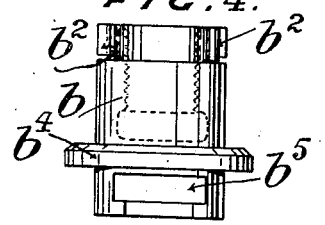
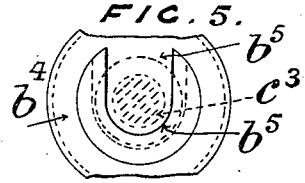
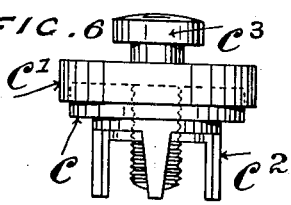
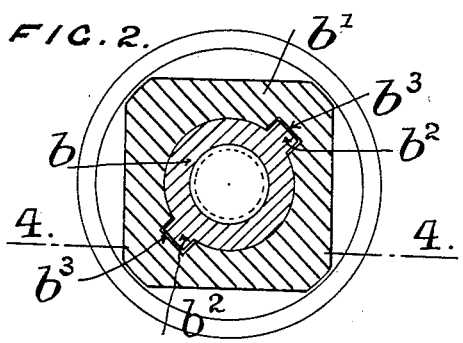

BENJAMIN BUTLER AND WILFRED BUTLER, OF DUKINFIELD, ENGLAND.

STOPCOCK OR VALVE.

1,370,875.      Specification of Letters Patent.      Patented Mar. 8, 1921.

Application filed October 24, 1919. Serial No. 332,875.

*To all whom it may concern:*

Be it known that we, BENJAMIN BUTLER and WILFRED BUTLER, subjects of the King of Great Britain and Ireland, residing at Dukinfield, in the county of Chester, England, have invented new and useful Improvements in and Connected with Stopcocks or Valves, of which the following is a specification.

This invention relates to stop cocks or valves for controlling the flow of fluids.

The object is to produce a more efficient type of stop valve and one which shall not be liable to become defective even under hard wear and so shall call for a minimum amount of attention.

We employ an operating spindle with collar, which spindle while being suitably packed is free to be rotated, but which operating spindle does not move up or down in the act of opening or closing the valve. This operating spindle actuates directly a vertically movable threaded barrel, nut or sleeve which accurately fits and is guided by the upper part or half of the valve casing. This threaded barrel, nut or sleeve carries means which, while allowing the same to move up or down; prevent rotation and also carries or supports a face or surface which when the valve is fully open, beds on a surface and helps to pack the threaded barrel, nut, or sleeve, and so augments the action of the packing about the operating spindle. The vertically movable threaded barrel, nut or sleeve carries or has connected to it, a valve or clack, and such valve or clack may be free to rotate or accommodate itself to the valve seat. The valve seat may be formed in the lower half or body of the valve, or same may be a separately applied valve seat, as shown, having a conical or tapered portion fitting a corresponding tapered portion of the division web, the valve seat being screwed into position or held by the action of a screw thread. Tool holes are provided for applying and removing the valve seat. Any other form of valve seat may be used either formed in the division web or otherwise or separately applied.

In order to better indicate the nature of our invention we will describe by reference to the attached drawing a suitable construction of valve in accordance with our invention.

In the said drawing:—

Figure 1 shows a vertical section of a type of valve embodying the features of novelty.

Fig. 2 is a section on the line 1—1, Fig. 1.

Fig. 3 shows a plan view of the detachable valve seat.

Fig. 4 is an elevation showing the movable threaded barrel separately, the view being taken at right angles to the line 4—4, Fig. 2.

Fig. 5 is an inverted plan view of Fig. 4.

Fig. 6 shows a form of movable valve carrier which engages and is actuated by the movable barrel seen in Fig. 4.

We make use of a suitable operating spindle such as $a$ and this is formed with or carries a plain collar $a'$, while the lower portion is screw threaded as at $a^2$. The collar is ground on or fits a shoulder in the bored upper part $b'$ of the valve body, and works thereon. The spindle is packed by a ring of packing $a^3$ and a gland $a^4$ made in one, two or more parts and operated by a nut $a^5$. As thus constructed, the packed operating spindle $a$ can rotate but does not move up or down. The lower screw-threaded portion of the rotatable spindle fits in a threaded barrel, nut, or sleeve, such as the barrel $b$ which device is accurately turned and is free to slide up and down in a bored cavity in the upper half or body casting $b'$ of the valve. Projections or lugs $b^2$, $b^2$ from the threaded barrel, nut, or sleeve, engage vertical grooves or channels $b^3$, $b^3$ cut in the upper half or body of the valve (see Fig. 2). The purpose of the projections or lugs $b^2$, $b^2$ is to prevent the threaded barrel, nut, or sleeve $b$, from rotating while not interfering with the up and down movement. Any other equivalent arrangement may be used for this purpose. Said threaded barrel, nut, or sleeve $b$ by preference also carries or supports an annular flange $b^4$ which, when the valve is fully opened, beds against a seat $b^6$ formed in the upper half or casting carrying the valve spindle and adjuncts. Such annular flange works in an enlarged opening concentric with the bore of the upper part of the valve body and conveniently of larger diameter than the threaded barrel, nut, or sleeve. The actual valve itself may be attached to or carried by the threaded barrel $b$, but for convenience and simplicity we use a detachable sleeve valve $c$ which is applied to a dished metal support $c'$ and secured by a wing-nut $c^2$ the support having a head $c^3$ which fits in a slotted gap or recess $b^5$ at the bottom of the barrel $b$ (see Figs. 4 and 5). A fixed valve seat may be used, but preferably the actual valve works to a removable valve seat such as $d$ which has a collar and a tapered or conical part $d'$ fitting a tapered or conical shoulder $e'$ in the bored web $e$ of the lower half of the valve casing or casting, the valve seat being screwed into place. This may however be greatly varied and we in no way restrict ourselves. The detachable valve seat has tool holes $d^2$ cut in its annular flange.

When our valve is at work, rotation of the valve spindle works the threaded barrel, nut, or sleeve, up and down, and so opens or closes the valve. As the spindle only rotates, and as the threaded barrel, nut, or sleeve, only moves up and down, extremely little wear occurs. The rotatable spindle can be well and easily packed, and the threaded barrel, nut or sleeve (being a good fit) to a great extent packs itself, while the annular flange on or in connection with the threaded barrel, nut, or sleeve, in a measure serves as a guiding and packing means. Thus we get as it were a triple guided and triple packed valve of very simple and durable construction.

Slight variations may be necessary in accordance with the particular type of valve to which our improvements are applied.

It is obvious that the gland employed and the construction may be such as not to require the introduction of a packing to pack the spindle, as for example, we may depend on ground faces or parts and so make the valve packingless.

What we claim is.

1. A stop valve, comprising an upper body portion and a lower body portion detachably secured together, said upper body portion having a longitudinal bore therein, said bore being of larger diameter at the upper portion than at the lower portion thereof. thereby to form a shoulder in said bore, a spindle rotatable in said bore and having secured thereto a collar seated on said shoulder, said spindle being exteriorly threaded below said collar, a gland for retaining said collar on its seat, said bore having in its side wall a pair of oppositely disposed longitudinally extending guide grooves, an interiorly threaded barrel member engaging the threaded portion of the spindle and having a pair of guide lugs slidable in said grooves, said upper body portion having at its lower end an enlarged opening concentric with its bore, an annular flange carried by said barrel member and operating within said enlarged opening, and a valve removably supported by said barrel at its lower end, the lower body portion being provided with a dividing web having an opening therein, and a removable valve seat secured in said opening for coöperation with said valve.

2. A stop valve, comprising an upper body portion and a lower body portion detachably secured together, said upper body portion having a longitudinal bore therein, said bore being of larger diameter at the upper portion than at the lower portion thereof thereby to form a shoulder in said bore, a spindle rotatable in said bore and having secured thereto a collar seated on said shoulder, said spindle being exteriorly threaded below said collar, a gland for retaining said collar on its seat, said bore having in its side wall a pair of oppositely disposed longitudinally extending guide grooves, an interiorly threaded barrel member engaging the threaded portion of the spindle and having a pair of guide lugs slidable in said grooves, said upper body portion having at its lower end an enlarged opening concentric with its bore, an annular flange carried by said barrel and operating within said enlarged opening, said barrel having at its lower end a recess and a valve removably secured to said barrel in concentric relation with said recess, the lower body portion being provided with a dividing web having an opening therein and a removable valve seat secured in said opening for coöperation with said valve.

3. A stop valve, comprising an upper body portion and a lower body portion detachably secured together, said upper body portion having a longitudinal bore therein, said bore being of larger diameter at the upper portion than at the lower portion thereof thereby to form a shoulder in said bore, a spindle rotatable in said bore and having secured thereto a collar seated on said shoulder, said spindle being exteriorly threaded below said collar, a gland for retaining said collar on its seat, said bore having in its side wall a pair of oppositely disposed longitudinally extending guide grooves, an interiorly threaded barrel member engaging the threaded portion of the spindle and having a pair of guide lugs slidable in said grooves, said upper body portion having at its lower end an enlarged opening concentric with its bore, an annular flange carried by said barrel and operating within said enlarged opening, said barrel having at its lower end a recess of greater width at one portion thereof than at another thereby to form a seat and a radially disposed opening communicating with said recess, and a valve provided with a headed member adapted to pass through said radial opening and engage said seat for removably retaining said valve in said barrel, the lower body portion being provided with a removable valve seat secured therein for coöperation with said valve.

In testimony whereof we have signed our names to this specification.

BENJAMIN BUTLER.
WILFRED BUTLER.